(12) United States Patent
Nakamura

(10) Patent No.: US 12,238,200 B2
(45) Date of Patent: Feb. 25, 2025

(54) CRYPTOGRAPHIC TECHNIQUE FOR ENCRYPTING AND DECRYPTING ON A SINGLE DATA PROCESSING DEVICE

(71) Applicant: NTI, Inc., Yokkaichi (JP)

(72) Inventor: Takatoshi Nakamura, Tokyo (JP)

(73) Assignee: NTI, INC., Mie (JP)

( * ) Notice: Subject to any disclaimer, the term of this patent is extended or adjusted under 35 U.S.C. 154(b) by 381 days.

(21) Appl. No.: 17/625,108

(22) PCT Filed: Jul. 9, 2020

(86) PCT No.: PCT/JP2020/026848
§ 371 (c)(1),
(2) Date: Jul. 22, 2022

(87) PCT Pub. No.: WO2021/006313
PCT Pub. Date: Jan. 14, 2021

(65) Prior Publication Data
US 2023/0050675 A1      Feb. 16, 2023

(30) Foreign Application Priority Data
Jul. 9, 2019    (JP) ................................. 2019-127893

(51) Int. Cl.
*H04L 9/06*         (2006.01)
(52) U.S. Cl.
CPC ................... *H04L 9/0618* (2013.01)
(58) Field of Classification Search
CPC ..................................................... H04L 9/0618
USPC ........................................................... 380/28
See application file for complete search history.

(56) References Cited

U.S. PATENT DOCUMENTS

| | | | | |
|---|---|---|---|---|
| 8,060,743 B2* | 11/2011 | Struik | .................. | H04L 9/0618 713/160 |
| 2008/0080709 A1* | 4/2008 | Michtchenko | ........ | H04L 9/0618 380/44 |
| 2009/0141889 A1* | 6/2009 | Nakamura | ......... | G11B 20/0021 380/28 |

(Continued)

FOREIGN PATENT DOCUMENTS

| JP | 2001356952 A | 12/2001 |
|---|---|---|
| JP | 2006253745 A | 9/2006 |

OTHER PUBLICATIONS

International Search Report, PCT/JP2020/026848, Dec. 1, 2020, 4 pages.

*Primary Examiner* — David P Zarka
(74) *Attorney, Agent, or Firm* — Edell, Shapiro & Finnan, LLC

(57) ABSTRACT

Provided is a cryptographic technology which is capable of being used when encryption and decryption are performed in a single data processing device. A data processing device is configured to generate encrypted data by encrypting processing target data and record the generated encrypted data in a predetermined recording medium, and to decrypt the encrypted data recorded in the recording medium back into the processing target data. The processing target data is data of a text. Encryption is performed in units of plaintext split data generated by splitting the processing target data into pieces having a predetermined number of bits. The units of the splitting are equal to or shorter than a bit length of a code for identifying characters in the text.

12 Claims, 5 Drawing Sheets

(56) References Cited

U.S. PATENT DOCUMENTS

| | | | |
|---|---|---|---|
| 2012/0179920 A1* | 7/2012 | Farrugia | H04L 9/0631 |
| | | | 713/193 |
| 2013/0168450 A1* | 7/2013 | von Mueller | H04L 9/0618 |
| | | | 235/449 |
| 2015/0349950 A1* | 12/2015 | Shrimpton | H04L 9/0625 |
| | | | 713/189 |
| 2017/0012948 A1* | 1/2017 | Peeters | H04L 9/3247 |
| 2017/0061833 A1* | 3/2017 | Joye | H04L 9/008 |
| 2017/0195117 A1* | 7/2017 | Wu | G09C 1/00 |
| 2017/0331624 A1* | 11/2017 | Samid | H04L 9/0618 |
| 2019/0171843 A1* | 6/2019 | Sun | G06F 21/6245 |
| 2019/0268146 A1* | 8/2019 | Samid | H04L 9/0852 |
| 2019/0363877 A1* | 11/2019 | Figueira | H04L 9/0869 |
| 2020/0177380 A1* | 6/2020 | Prince | H04L 9/0869 |
| 2021/0028934 A1* | 1/2021 | Hamburg | G06F 21/75 |
| 2021/0058244 A1* | 2/2021 | Jacak | H04L 9/0852 |

* cited by examiner

CRYPTOGRAPHIC TECHNIQUE FOR ENCRYPTING AND DECRYPTING ON A SINGLE DATA PROCESSING DEVICE

TECHNICAL FIELD

The present invention relates to a data processing device capable of encrypting processing target data which is plaintext to generate encrypted data and then recording the encrypted data in a predetermined recording medium, and decrypting the encrypted data when the encrypted data is read out from the recording medium.

BACKGROUND ART

It is said that the origin of cryptographic technology dates back to B.C.

A well-known old cipher is the Caesar cipher. The Caesar cipher is a very simple substitution cipher. In the cryptographic technology, two parties are required, that is, a person (sender) who encrypts plaintext into ciphertext, and a person (receiver) who receives and decrypts the ciphertext. As can be understood from common sense, when a cipher is not breakable by a third party and can be correctly decrypted by the person decrypting the ciphertext, the cipher can be said to be a good cipher.

For example, with the Caesar cipher, English words consisting only of letters of the alphabet are encrypted. Only 26 characters are used to compose English words. With the Caesar cipher, the sender and the receiver decide on two rules. One of the rules is to shift some characters in the Caesar cipher. The other rule relates to the number of characters to shift. The former is an algorithm in the cryptographic technology, and the latter is a key in the cryptographic technology. For example, in a case in which the original plaintext is "IBM," in accordance with the above-mentioned two rules, when the original plaintext is encrypted based on a key of "−1" or "25," each character constituting the word "IBM" is shifted one character in front or 25 characters backward, to form "HAL." The receiver receives the ciphertext "HAL," uses the above-mentioned algorithm and key, and then subjects the ciphertext to the opposite processing to that performed by the sender encrypting. As a result, each character constituting the word "HAL" is shifted one character backward or 25 characters in front, to form "IBM." People who do not know both the algorithm and the key are not able to decipher the plaintext "IBM" from the ciphertext "HAL." The Caesar cipher is thus a simple cipher, but the Caesar cipher did at least achieve great results in the days when the Caesar cipher was used.

In the Caesar cipher, there is only one type of algorithm, and from the viewpoint of an impact on the encryption processing, the number of types of keys is at most 26 (or 26×2=52 even when shifting in the opposite direction is considered). Therefore, assuming that a person attempting to decrypt the ciphertext illegitimately knows the algorithm, the person can decipher the ciphertext by trying all of the 26 (or 52) types of keys.

The history of cryptography is the history of human effort to prevent a ciphertext from being deciphered. Among such efforts, various cryptographic technologies have been proposed. As a matter of course, the Caesar cipher is a very simple cipher, and is thus is easy to decipher. However, even with the ciphers in use today, which use technology so complex that those ciphers are incomparable to the Caesar cipher, in particular, when an amount of ciphertext transmitted and received between the sender and the receiver increases, it is possible to decipher the ciphertext in the end by analyzing a huge amount of ciphertext data through use of a computer.

SUMMARY OF INVENTION

Technical Problem

However, there are several cryptographic technologies which in the past have been proven to be unbreakable.

For example, Vernam ciphers and one-time pad ciphers are such examples. Those ciphers have been mathematically proven to be unbreakable when certain conditions are satisfied.

In a Vernam cipher, a long tape having many holes corresponding to plaintext and a long tape having many holes corresponding to a key are used. The tape corresponding to the key is the same for both the sender and the receiver. The sender overlays the two tapes, and creates a third tape in accordance with a certain rule corresponding to the algorithm, for example, a rule that holes are opened in places at which there are holes only in one of the first tape and the second tape, and not in places at which there are holes on both of the first tape and the second tape or in places at which there are not holes on both of the tapes. This third tape corresponds to the ciphertext. The rule is also shared between the sender and the receiver.

The third tape is transmitted from the sender to the receiver. The receiver receives the third tape, overlays the second tape that he or she has on the third tape, opens holes in accordance with the same rule as the rule described above, that is, in places at which the only one of the third tape and the second tape have holes, and creates a fourth tape by appropriately opening holes on a new tape in accordance with the rule that the receiver does not open holes in places at which there are holes on both of the third tape and the second tape or there are not holes on both of the tapes.

As a result, the fourth tape returns to the first tape. That is, the receiver can return the third tape being the ciphertext to the first tape by using the second tape as an algorithm and a key shared with the sender. As a result, encrypted communication is established.

Such a Vernam cipher has been mathematically proven to be unbreakable by a third party as long as the condition that "the second tape being the key is different each time and is secret to a third party" is satisfied.

However, as the amount of ciphertext between the sender and the receiver increases, the length of the second tape becomes longer and longer. In other words, the security of the Vernam cipher is not ensured unless there is a key whose secrecy has been kept having an amount of information in which the number of characters is equal to or more than the length of the character string of the plaintext to be encrypted and transmitted. Therefore, Vernam ciphers are difficult to use in practice. This is why Vernam ciphers are not used very much in encrypted communication by computers.

Further, similarly to Vernam ciphers, cryptographic technology called "one-time pad" is also known to be an unbreakable cipher. One-time pad encryption shares, as a key, a bundle of random number tables that can only be used one time, like a daily calendar which is discarded after use, between the sender and the receiver, and the sender and receiver use and then discard a new random number table each time encryption and decryption are performed. Naturally, the bundle of the random number tables becomes thicker as the number of characters to be transmitted and received increases. Therefore, like Vernam ciphers, one-time pad ciphers are also difficult to use in practice.

The reason why Vernam ciphers and one-time pad ciphers are not so popular is that, as described above, Vernam ciphers and one-time pad ciphers require long or large-data keys having the same amount of information as that of the plaintext to be held between the sender and the receiver before the data of the plaintext is encrypted. In a Vernam cipher, the key is a long tape in which holes have been randomly formed, and in a one-time pad cipher, the key is a random number table. In both Vernam ciphers and one-time pad ciphers, the condition that the same key can only be used only once is required to ensure the completeness of the cipher.

Therefore, when a Vernam cipher or a one-time pad cipher is used, a serious issue is how the sender and the receiver both hold such a long and one-time key that can only be used once for each encrypted communication. Moreover, the sharing of the key between the sender and the receiver is required each time the ciphertext is transmitted and received, and as the number of transmissions and receptions increases, such sharing becomes more and more burdensome. This may be easy when the sender and the receiver can physically contact each other, but when physical contact is possible, encrypted communication is not required. For this reason, both Vernam ciphers and one-time pad ciphers suffer from a low level of practicality.

In the above description, there is given a description of the cryptographic technology used when communication between two parties is performed, but encryption technology also exists for cases in which the processing of encrypting plaintext data and the processing of returning the encrypted data into plaintext are performed in a single device (data processing device). Naturally, technology having an encryption strength which is unbreakable or close to unbreakable is required even when encryption processing and decryption processing are performed in such a single data processing device.

It is an object of the present invention to provide a highly practical cryptographic technology which is capable of being used when encryption and decryption are performed in a single data processing device and which can be said to be unbreakable, or close to unbreakable.

Solution to Problem

In order to achieve the above-mentioned object, the inventor of the present application proposes the following invention.

A data processing device according to the present invention is as follows.

According to one embodiment of the present invention, there is provided a data processing device, which includes: a function of generating encrypted data by encrypting processing target data, which is data relating to a text and is plaintext, by using a different method for each piece of processing target data; a recording medium configured to record the encrypted data; and a function of generating processing target data by decrypting encrypted data read out from the recording medium by using the same method as the method used to encrypt the encrypted data.

Further, the data processing device includes: a splitting module configured to generate a plurality of pieces of plaintext split data by splitting the processing target data into pieces having a predetermined number of bits, and to generate a plurality of pieces of encrypted split data by splitting the encrypted data into pieces having the same number of bits as the number of bits used when the encrypted data is encrypted and split; an encryption/decryption module configured to generate encrypted split data by encrypting the plurality of pieces of plaintext split data by using a predetermined key and an algorithm, and to generate plaintext split data by decrypting the plurality of pieces of encrypted split data by using the predetermined key and the algorithm which have been used to encrypt the plurality of pieces of encrypted split data; a reading/writing module configured to record encrypted data obtained by gathering together the encrypted split data encrypted by the encryption/decryption module in the recording medium, and to read out the encrypted data recorded in the recording medium from the recording medium; and a connection module configured to generate the processing target data by connecting the decrypted plaintext split data.

In the data processing device, the splitting module is configured to generate a plurality of pieces of plaintext split data by splitting the processing target data into bit lengths equal to or shorter than a bit length of a code for identifying characters included in the text, and the encryption/decryption module is configured to use, when the plurality of pieces of plaintext split data are encrypted, a different method to encrypt at least one piece of the plurality of pieces of plaintext split data from the encryption method used to encrypt other pieces of the plurality of pieces of plaintext split data, and to use, when the plurality of pieces of encrypted split data obtained by the splitting module are decrypted, a different decryption method corresponding to the encryption method executed by the encryption/decryption module.

This data processing device includes the function of generating encrypted data by encrypting processing target data and the function of generating processing target data by decrypting encrypted data. The encryption function and the decryption function are executed by the encryption/decryption module included in the data processing device. The encrypted data generated from the processing target data is recorded in the recording medium.

When the processing target data is encrypted in the data processing device, the processing target data is split by the splitting module to generate plaintext split data. The plaintext split data is a unit in which encryption is to be performed, and the encryption/decryption module executes encryption processing on each piece of plaintext split data.

In the data processing device of the present application, the processing target data to be encrypted is the data of a text. As used herein, the text includes characters, numbers, and symbols. Spaces are also considered here to be characters. On the other hand, the data of the text does not include, for example, data on an image including a moving image and a still image, or audio data. In current cryptographic technology, the type of cases in which serious damage occurs when the cipher is broken is when the processing target data is a text. In the present invention, a particular focus is placed on such cases. In current computer technology, a text is replaced by a code listing a string of zeros and ones as data, and each character (including numbers and symbols; unless otherwise noted, the same below) is identified by a single code. For example, for English characters (including symbols; the same below), which are represented as single-byte characters, each character is identified as a code having a length of one byte (eight bits), and for Japanese characters, which are represented as double-byte characters, each character is identified as a code having a length of two bytes (16 bits).

Further, the splitting module of the data processing device of the present invention is configured to split the data to be transmitted so that the bit length of the plaintext split data, which is the size of the data on which the encryption/decryption module performs encryption processing and arithmetic operations in a single instance, is equal to or shorter (but obviously, is not zero bit) than the bit length of the code for identifying the characters included in the text.

That is, in the data processing device of the present application, encryption is performed by using, as one unit, data having a bit length which is equal to or shorter than the bit length of the code for identifying the characters, and each time decryption processing is performed, data having a length which is equal to or shorter than the bit length of the code for identifying the characters is obtained as one unit.

Moreover, in the data processing device of the present invention, in at least one instance of the processing of encrypting the plaintext split data performed the same number of times or more as the number of characters included in the plaintext, the encryption processing is executed in a manner different from that of the processing of encrypting the other plain split data. Naturally, this means that at least one of the instances of processing performed the same number of times or more as the number of characters included in the original plaintext for decrypting the encrypted split data, which is performed at a later point in order to later decrypt certain encrypted data generated by encrypting processing target data once again back into the processing target data in the encryption/decryption module of the data processing device that generated the encrypted data, is executed by a different method from the processing of decrypting the other encrypted split data.

As a result, the encrypted data generated by encrypting processing target data by the data processing device of the present application is indecipherable, or at least close to indecipherable. The reasons for this are as follows.

A person attempting to decrypt encrypted data, in general, a malicious third party, recognizes that the malicious third party has succeeded in decrypting the encrypted data when the malicious third party recognizes that the data or character string obtained by attempting to decrypt the encrypted data has returned back into "meaningful" data. Whether or not the character string is "meaningful" or "meaningless" can be determined based on the "subjective" judgement of the malicious third party, that is, whether or not the meaning of the character string obtained by the malicious third party can be grasped. When encryption and decryption processing are performed in units equal to or shorter than the code for identifying the characters, the data of one unit obtained by decryption by the malicious third party only identifies one character, or cannot even identify one character. As a result, when the data is joined, a code corresponding to the character string may be formed. However, when at least one piece of data per unit is encrypted by using a different method, there is a possibly that the character string obtained by the malicious third party attempting to decrypt the encrypted data has been converted back into a text having a plurality of meanings. This means that it is not possible for the malicious third party to be sure whether decryption has been successful based on a "subjective" judgement of whether or not the meaning of the obtained character string can be grasped.

The Caesar cipher is used as an example, and the plaintext is "DOG," for example. When the characters "D", "O", and "G" are encrypted by changing the key for each character (that is, when encryption is performed by changing the encryption method), the ciphertext "HAL" is obtained, for example. Then, for example, a malicious third party obtains the ciphertext and attempts to perform decryption. In this case, the plaintext character string obtained by the malicious third party may be "DOG," may be "CAT," may be "PIG," may be "EYE," or may be "YES." All of those are meaningful texts, and therefore even when the malicious third party works out the correct plaintext of "DOG," it is not possible for the malicious third party to determine whether "DOG" is the correct character string. As a result, the data encrypted by the present invention is indecipherable, or close to indecipherable.

Moreover, in the data processing device of the present invention, in at least one instance of the processing of encrypting the plaintext split data performed the same number of times or more as the number of characters included in the plaintext, the encryption processing is executed in a manner different from that of the processing of encrypting the other plain split data. The encryption processing is performed by using a key and an algorithm, and therefore encryption by using a different method can be achieved by making at least one of the key or the algorithm different from those in the other instances of the encryption processing. The encryption/decryption module may be configured to change the method of encrypting the plaintext split data by changing at least one of the algorithm or the key to be used in encryption.

With the data processing device of the present invention, the malicious third party does not know which encrypted split data is encrypted by what method, and therefore it becomes almost impossible to decipher the data encrypted by the data processing device according to the present invention. In the data processing device of the present invention, at least one instance of the processing of encrypting plaintext split data by the encryption/decryption module is performed by using a different encryption method from those of the other instances of the processing of encrypting the plaintext split data, but it is permissible to use the same encryption method in a plurality of instances of the processing of encrypting the plaintext split data.

In the data processing device of the present invention, the splitting module may be configured to split the processing target data into a fixed number of bits. Meanwhile, the splitting module may be configured to split the processing target data so that at least one piece of the plaintext split data except the last piece has a number of bits different from the number of bits of other pieces of the plaintext split data. With the latter configuration, it becomes more difficult for a malicious third party to break the encryption method. In the latter case, the reason why a piece of the plaintext split data except the last piece of plaintext split data is made to have a number of bits different from those of the other pieces of plaintext split data is because when a plurality of pieces of plaintext split data are generated by splitting the processing target data, the last piece of plaintext split data may be smaller than the other pieces of plaintext split data simply because the amount of data is insufficient. That is, when pieces having different numbers of bits are included in many pieces of the plaintext split data other than the last piece of the plaintext split data, the condition "at least one piece of the plaintext split data except the last piece has a number of bits different from those of the other pieces of plaintext split data" is satisfied.

The data processing device may further include a mixing module configured to align, before encryption by the encryption/decryption module into the plaintext split data obtained by the splitting module, the number of bits of all the plaintext split data to a predetermined number of bits by including dummy data unrelated to the processing target data. In this case, the data processing device may include a removing module configured to remove the dummy data from the plaintext split data obtained by decrypting the encrypted split data by the encryption/decryption module. Through including dummy data unrelated to the data for identifying the text in the plaintext split data, it becomes more difficult for a malicious third party to break the encryption method. The dummy data can be included in the plaintext split data even when the splitting module is configured to split the processing target data into pieces having a fixed number of bits, and even when the splitting module is configured to split the processing target data so that at least one piece of the plaintext split data except the last piece has a different number of bits different from those of the other pieces of plaintext split data. The bit length of each piece of plaintext split data in which dummy data has been included as required so that the number of bits is the same may be longer than the bit length of the code for identifying the characters included in the text.

The mixing module may be configured to include the dummy data at a specific position of the processing target data. The mixing module may be configured to include the dummy data at a predetermined position which is different for each piece of the plaintext split data. With the latter configuration, it becomes more difficult for a malicious third party to break the encryption method.

As described above, the encryption/decryption module of the data processing device of the present invention is configured to use, when encrypting the plaintext split data, a different encryption method for at least one piece of plaintext split data from the encryption method executed to encrypt the other pieces of plaintext split data. Therefore, the encryption/decryption module of the data processing device of the present application changes the encryption method at a given timing. The timing of changing the encryption method can be freely determined, but for example, the encryption/decryption module may change the method of encrypting the plaintext split data each time the plaintext split data is encrypted. As a matter of course, the encryption/decryption module may be configured to change the encryption method each time a predetermined number of pieces of processing target data (the predetermined number is not limited to a fixed number, but when the predetermined number is fixed, the predetermined number may be two or three, for example) is encrypted. Further, the encryption/decryption module may be configured to change the method of encrypting the plaintext split data each time a certain point in time is reached or when a predetermined time has elapsed since start of generation of the first piece of encrypted split data, for example.

As described above, the encryption/decryption module of the data processing device of the present invention changes the method of encrypting the plaintext split data at a certain timing. In that case, in a case in which decryption processing is to be performed, unless the encryption/decryption module again grasps how the encryption method and timing are changed when the encryption/decryption module encrypts the plaintext split data, the processing of decrypting the encrypted split data may not be performed properly. Such an encryption method and timing can be grasped, for example, as follows.

For example, the data processing device may further include a solution generation module configured to generate the same solution, which is a pseudorandom number, under the same condition, and the encryption/decryption module may be configured to determine the encryption method and the decryption method based on the solution generated by the solution generation module. The encryption/decryption module changes the encryption and decryption methods in accordance with the changes to the solutions by using solutions generated by the same solution generation module to determine the encryption and decryption methods. When the solutions (set of a plurality of solutions) used for encryption is the same as the solutions (set of a plurality of solutions) used for decryption, during decryption, the encryption/decryption module can change the decryption method so as to match the change to the encryption method by the encryption/decryption module during encryption. For example, a mechanism equivalent to a publicly-known or a well-known mechanism for generating a one-time password can be applied to the solution generation module. There are two known types of mechanisms for generating a one-time password. One is a method in which the one-time password is changed based on the number generated in the past, and the other is a method in which the one-time password is generated based on the time when the one-time password is to be generated. However, both of those can be applied to the solution generation module. Regardless of which technology is applied, the solutions generated by the solution generation module are pseudorandom numbers having a nature which depends on the initial solution (there may be a plurality of initial solutions), which is the first solution.

The data processing device may further include identification and recording module for recording identification information for identifying the encryption method used when the processing target data is encrypted by the encryption/decryption module in association with the encrypted data generated by encrypting the processing target data, and the encryption/decryption module may be configured to decrypt, when the encrypted data is decrypted, the encrypted data by a method identified by the identification information by reading out the identification information recorded in association with the encrypted data from the identification and recording module. The identification information can be any information for identifying the encryption method used when processing target data has been encrypted by the encryption/decryption module. However, in the above-mentioned case in which the encryption/decryption module changes the encryption and decryption methods based on the solution, for example, the above-mentioned initial solution is an example of the identification information.

The inventor of the present application also proposes a method to be executed by a data processing device as a mode of the present invention. The effects of that method are the same as the effects of the data processing device according to the present invention.

As an example, there is provided a data processing method to be executed by a data processing device configured to execute the steps of: generating encrypted data by encrypting processing target data, which is data relating to a text and is plaintext, by using a different method for each piece of processing target data; recording the encrypted data in a predetermined recording medium; and generating processing target data by decrypting encrypted data read out from the recording medium by using the same method as the method used to encrypt the encrypted data.

The method, which is executed by the data processing device, includes the steps of: generating a plurality of pieces of plaintext split data by splitting the processing target data into pieces having a predetermined number of bits; generating encrypted split data by encrypting the plurality of pieces of plaintext split data by using a predetermined key and an algorithm; recording encrypted data obtained by gathering together the encrypted split data in the recording medium; reading out the encrypted data recorded in the recording medium from the recording medium; generating a plurality of pieces of encrypted split data by splitting the encrypted data into pieces having the same number of bits as the number of bits used when the encrypted data is encrypted and split; generating plaintext split data by decrypting the plurality of pieces of encrypted split data by using the predetermined key and the algorithm which have been used to encrypt the plurality of pieces of encrypted split data; and generating the processing target data by connecting the decrypted plaintext split data.

In the method, the step of generating a plurality of pieces of plaintext split data by splitting the processing target data into pieces having a predetermined number of bits includes generating the plurality of pieces of plaintext split data by splitting the processing target data into bit lengths equal to or shorter than a bit length of a code for identifying characters included in the text, the step of encrypting the plurality of pieces of plaintext split data includes using, when the plurality of pieces of plaintext split data are encrypted, a different method to encrypt at least one piece of the plurality of pieces of plaintext split data from the encryption method used to encrypt other pieces of the plurality of pieces of plaintext split data, and the step of decrypting the plurality of pieces of encrypted split data includes using, when the plurality of pieces of encrypted split data obtained in the step of splitting the encrypted data are decrypted, a different decryption method corresponding to the encryption method used in the step of encrypting the plurality of pieces of plaintext split data.

The inventor of the present application also proposes a computer program for causing a predetermined, for example, general-purpose computer to function as a data processing device of the present application as a mode of the present invention. The effects of the computer program are, in addition to the effects of the data processing device according to the present invention, that a general-purpose computer can function as the data processing device of the present invention.

As an example, there is provided a computer program for causing a predetermined computer to function as a data processing device including: a function of generating encrypted data by encrypting processing target data, which is data relating to a text and is plaintext, by using a different method for each piece of processing target data; a recording medium configured to record the encrypted data; and a function of generating processing target data by decrypting encrypted data read out from the recording medium by using the same method as the method used to encrypt the encrypted data.

The computer program causes the predetermined computer to execute the steps of: generating a plurality of pieces of plaintext split data by splitting the processing target data into pieces having a predetermined number of bits; generating encrypted split data by encrypting the plurality of pieces of plaintext split data by using a predetermined key and an algorithm; recording encrypted data obtained by gathering together the encrypted split data in the recording medium; reading out the encrypted data recorded in the recording medium from the recording medium; generating a plurality of pieces of encrypted split data by splitting the encrypted data into pieces having the same number of bits as the number of bits used when the encrypted data is encrypted and split; generating plaintext split data by decrypting the plurality of pieces of encrypted split data by using the predetermined key and the algorithm which have been used to encrypt the plurality of pieces of encrypted split data; and generating the processing target data by connecting the decrypted plaintext split data.

In the computer program, the step of generating a plurality of pieces of plaintext split data by splitting the processing target data into pieces having a predetermined number of bits includes causing the predetermined computer to generate the plurality of pieces of plaintext split data by splitting the processing target data into bit lengths equal to or shorter than a bit length of a code for identifying characters included in the text, the step of encrypting the plurality of pieces of plaintext split data includes causing the predetermined computer to use, when the plurality of pieces plaintext split data are encrypted, a different method to encrypt at least one piece of the plurality of pieces of plaintext split data from the encryption method used to encrypt other pieces of the plurality of pieces of plaintext split data, and the step of decrypting the plurality of pieces of encrypted split data includes causing the predetermined computer to use, when the plurality of pieces of encrypted split data obtained in the step of splitting the encrypted data are decrypted, a different decryption method corresponding to the encryption method used in the step of encrypting the plurality of pieces of plaintext split data.

DESCRIPTION OF EMBODIMENTS

Now, first and second embodiments of the present invention are described. In the description of the embodiments, the same objects are denoted by the same reference symbols, and common description is omitted in some cases.

First Embodiment

In the first embodiment, a data processing device 10 is described.

The data processing device 10 may be a commercially available computer device when viewed as hardware. A computer program described later is installed in the data processing device 10. The hardware of the data processing device 10 works together in cooperation with the computer program such that the data processing device 10 acquires a function of encrypting processing target data, which is predetermined plaintext data, into encrypted data, and a function of decrypting the encrypted data back into the original processing target data.

First, the data processing device 10 is described from a hardware perspective.

In this embodiment, the data processing device 10 is built from a general-purpose computer. However, the data processing device 10 is not limited to a general-purpose computer.

The data processing device 10 is a mobile phone, a smartphone, a tablet, a laptop computer, a desktop computer, or the like. All of those components are required to be capable of generating function blocks described later in the data processing device 10 by installing a computer program described later, and executing processing described later. As long as the data processing device 10 is capable of implementing those tasks, other specifications of the data processing device 10 are not particularly limited.

For example, when the data processing device 10 is a smartphone or a tablet, as a smartphone, the data processing device 10 may be, for example, a product of an iPhone series manufactured and sold by Apple Japan GK, and as a tablet, the data processing device 10 may be, for example, a product of an iPad series manufactured and sold by Apple Japan GK. There is now described a case in which the data processing device 10 is a smartphone, but the present invention is not limited thereto.

Figure 1:
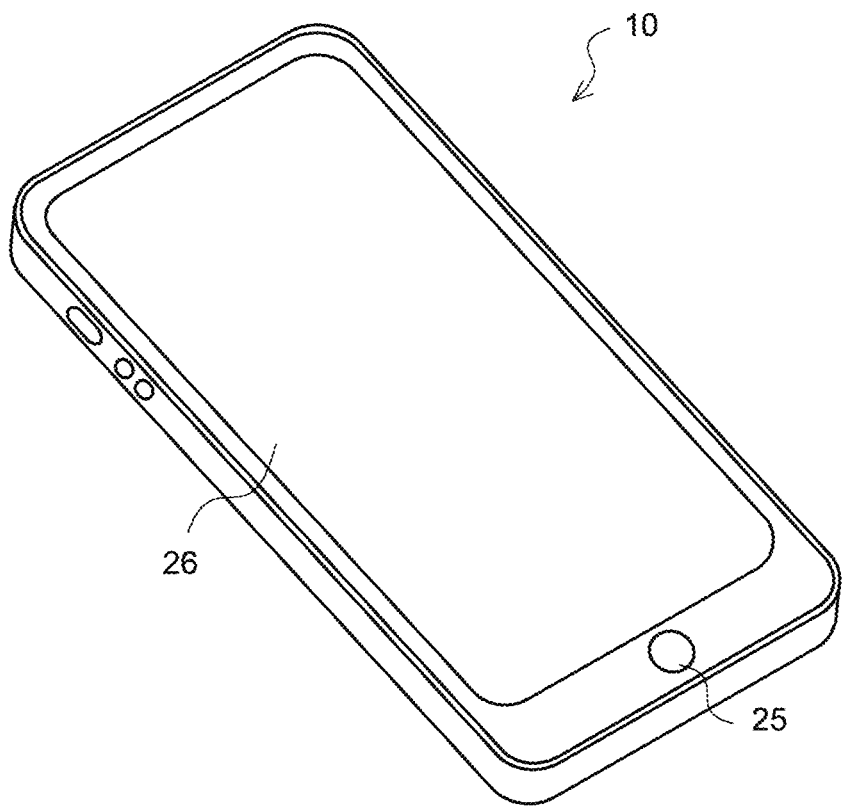
FIG. 1 is a perspective view for illustrating an appearance of a data processing device according to a first embodiment of the present invention.

An example of the appearance of the data processing device 10 is illustrated in FIG. 1.

The data processing device 10 includes a display device 26. The display device 26 is used for displaying a still image or a moving image, and a publicly-known or well-known display may be used. The display device 26 is, for example, a liquid crystal display. The data processing device 10 also includes an input device 25. The input device 25 is used by a user to perform desired input to the data processing device 10. As the input device 25, a publicly-known or well-known input device may be used. The input device 25 of the data processing device 10 in this embodiment is a button type input device, but the input device 25 is not limited thereto, and a numeric keypad, a keyboard, a trackball, a mouse, and the like may also be used. In particular, when the data processing device 10 is a laptop computer or desktop computer, the input device 25 is likely to be a keyboard, a mouse, or the like. When the display device 26 is a touch panel, the display device 26 also acts as the input device 25, which is the case in this embodiment.

Figure 2:
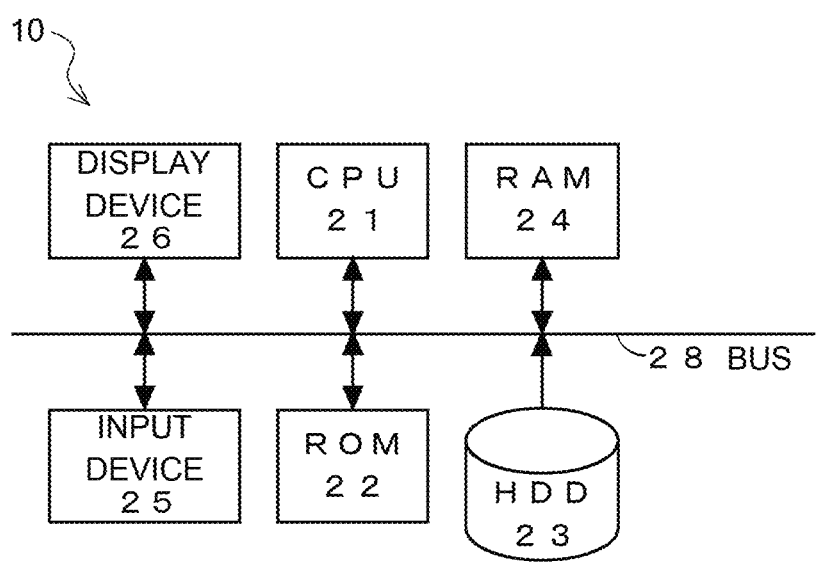
FIG. 2 is a diagram for illustrating a hardware configuration of the data processing device illustrated in FIG. 1.

A hardware configuration of the data processing device 10 is illustrated in FIG. 2.

The hardware includes a central processing unit (CPU) 21, a read-only memory (ROM) 22, a hard disk drive 23 (HDD), and a random-access memory (RAM) 24, which are mutually connected to one another by a bus 28. Further, the display device 26 and the input device 25 are also connected to the bus 28. The data input from the input device 25 is input to the bus 28 and transmitted to the CPU 21. Moreover, image data may be transmitted from the bus 28 to the display device 26, and when the image data is received, the display device 26 displays an image based on the image data.

The CPU 21 is an arithmetic device which performs an arithmetic operation. The CPU 21 executes processing described later by executing, for example, a computer program recorded in the ROM 22 or the RAM 24. The arithmetic operation executed by the CPU 21 is executed based on, for example, input from the input device 25. The above-mentioned computer program may be recorded in the HDD 23, which is an example of a large-capacity recording device. In such a case, the CPU 21 executes the processing described later by executing the computer program recorded in the HDD 23.

As used herein, the computer program includes at least a computer program for causing the data processing device 10 to function as the data processing device of the present invention. The computer program may be preinstalled on the data processing device 10 or may be subsequently installed on the data processing device 10 after the data processing device 10 is shipped. The computer program may be installed on the data processing device 10 via a predetermined recording medium, for example, a memory card, or may be installed via a network such as a LAN or the Internet.

The ROM 22 records the above-mentioned computer programs and data required in order for the CPU 21 to execute the processing described later. The computer program recorded in the ROM 22 is not limited thereto. When the data processing device 10 is a smartphone, a computer program or data for executing, for example, a call or an electronic mail required in order for a client to function as a smartphone may be recorded. The data processing device 10 may implement a publicly-known web browser for allowing browsing of web pages based on data received via a network.

The RAM 24 provides a work area required in order for the CPU 21 to perform processing. In some cases, the above-mentioned computer program or data may be recorded.

As described above, the HDD 23 is a large-capacity recording medium. At least a part of the computer programs and data described as being recorded in the ROM 22 may be recorded in the HDD 23. The data included in the HDD 23 may include data that may become the processing target data, which is the case in this embodiment. The processing target data may be recorded in the RAM 24. Further, the encrypted data may be recorded in the HDD 23. The encrypted data may also be recorded in the RAM 24. The processing target data and encrypted data are described later.

Figure 3:
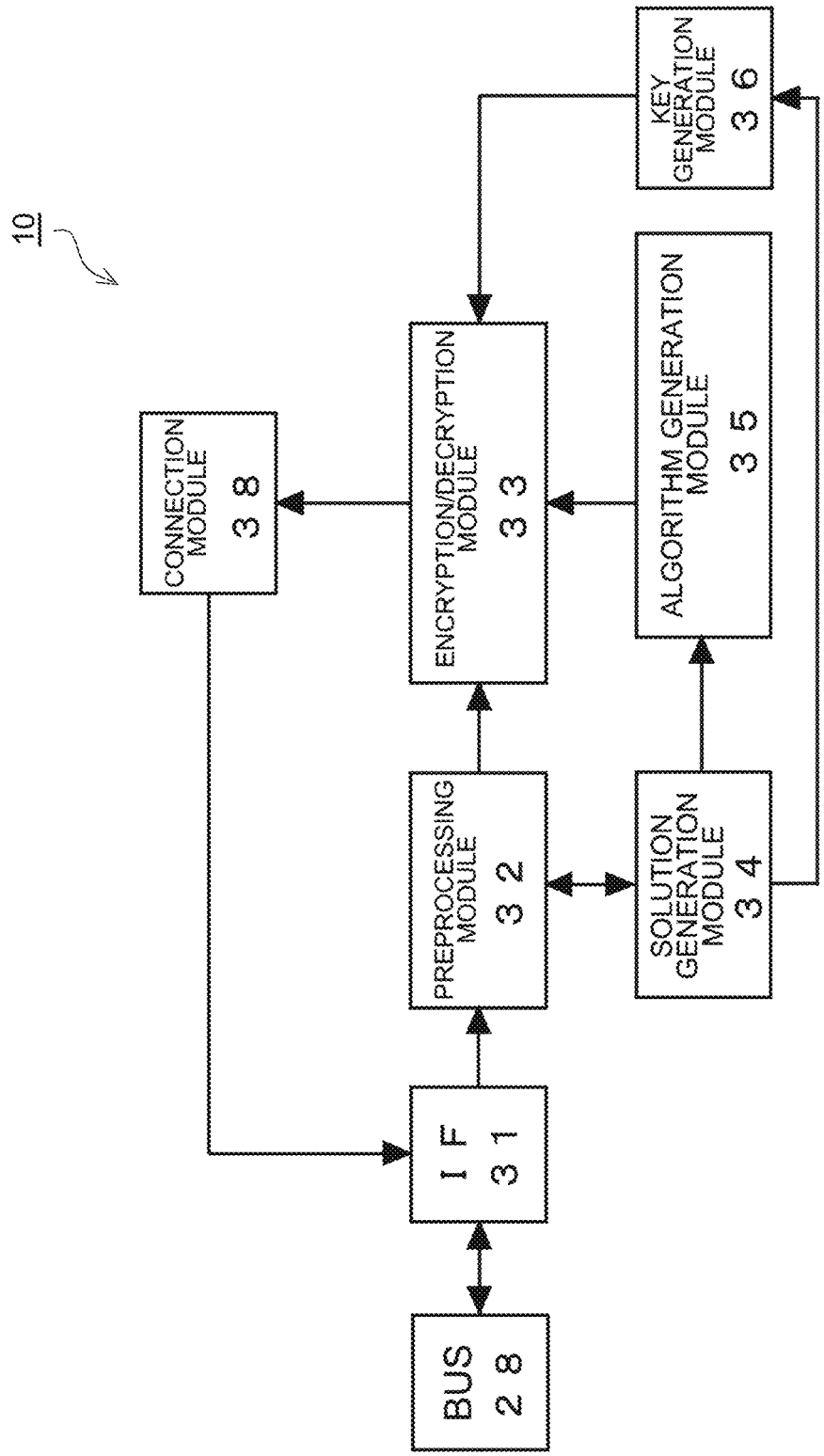
FIG. 3 is a block diagram for illustrating function blocks generated in the data processing device illustrated in FIG. 1.

When the CPU 21 executes the computer program, function blocks like those illustrated in FIG. 3 are generated in the data processing device 10. The following function blocks may be generated by the functions of the above-mentioned computer program alone for causing the data processing device 10 to function as the data processing device of the present invention, or may also be generated by the above-mentioned computer program and an OS or another computer program installed in the data processing device 10 working together in cooperation.

In the data processing device 10, an interface module 31, a preprocessing module 32, an encryption/decryption module 33, a solution generation module 34, an algorithm generation module 35, a key generation module 36, and a connection module 38 are generated.

The interface module 31 has a function of transmitting the data from the bus 28 to the preprocessing module 32, and a function of receiving the data from the connection module 38 and transmitting the received data to the bus 28.

The preprocessing module 32 has a function of generating plaintext split data or encrypted split data by splitting the processing target data or encrypted data (a series of a plurality of, or many, encrypted split data may be hereinafter referred to as "encrypted data") received from bus 28 via the interface module 31 into pieces having a predetermined number of bits, and transmitting the generated plaintext split data or encrypted split data to the encryption/decryption module 33. The processing target data is data of a text, and is plaintext data. Each character included in the processing target data, which is data of a text, is written based on a code for identifying each character. The method of splitting the processing target data or encrypted data is described later, but the plaintext split data is at least split into bit lengths equal to or shorter than the bit length of the code for identifying the characters included in the text. In this embodiment, the characters included in the processing target data are English, which are so-called single-byte characters, and the bit length of the code for identifying each character is eight bits. However, the characters are not limited to this. Moreover, in this embodiment, the preprocessing module 32 has a function of including dummy data, which is data unrelated to the processing target data, as required in the processing target data in a manner described later. However, the functions of the preprocessing module 32 are not limited to this. As described above, the preprocessing module 32 is configured to transmit, when plaintext split data is generated from processing target data, the plaintext split data to the encryption/decryption module 33. However, in addition to that, for example, the preprocessing module 32 is also configured to transmit, just before that, information indicating that the processing target data is to be split to the solution generation module 34. Further, the preprocessing module 32 is configured to transmit, when encrypted split data is generated from encrypted data, the encrypted split data to the encryption/decryption module 33, and in addition to that, for example, the preprocessing module 32 is also configured to transmit, just before that, information indicating that the encrypted data is to be split to the solution generation module 34.

The encryption/decryption module 33 has a function of receiving plaintext split data or encrypted split data from the preprocessing module 32, and encrypting the plaintext split data when the plaintext split data has been received and decrypting the encrypted split data when the encrypted split data has been received. The processing target data is data of a text, and includes a plurality of, and usually many, characters. The plaintext split data is data generated by splitting the processing target data into bit lengths equal to or shorter than the bit length of the code for identifying the characters. Therefore, the number of pieces of plaintext split data is equal to or more than the number of characters included in the processing target data, and hence there are a plurality of, and usually many, pieces of plaintext split data. The encryption/decryption module 33 is configured to perform encryption processing on the plurality of, and usually many, pieces of plaintext split data. Similarly, the encryption/decryption module 33 is configured to perform decryption processing on the plurality of, and usually many, pieces of encrypted split data. Details of the encryption and decryption processing are described later, but when encryption and decryption are performed, the encryption/decryption module 33 uses an algorithm supplied in a manner described later from the algorithm generation module 35 and a key supplied in a manner described later from the key generation module 36. In this embodiment, however, although not limited to this, the algorithm and key are supplied to the encryption/decryption module 33 each time the encryption/decryption module 33 performs encryption processing or each time the encryption/decryption module 33 performs decryption processing. In this embodiment, the encryption/decryption module 33 has a fixed processing unit when performing encryption and decryption processing. However, the processing unit of the encryption/decryption module 33 is not limited to this. Typically, the processing unit is determined depending on the hardware configuration of the data processing device 10, for example, depending on the specification of the CPU 21. In this embodiment, the processing unit is eight bits, but the processing unit is not limited to this. The length of the data to be encrypted in one time of encryption processing, or the unit of processing (hereinafter referred to as "standard number of bits") is equal to or longer than the length of the code (eight bits in this embodiment) for fixing the characters included in the processing target data.

The solution generation module 34 is configured to sequentially generate solutions. In this embodiment, the solution generation module 34 of the data processing device 10 is configured to sequentially generate solutions which are the same under the same condition. In this embodiment, the solutions are pseudorandom numbers, but the solutions are not required to be pseudorandom numbers. In this embodiment, although not limited to this, the generated solutions are transmitted to the preprocessing module 32, the algorithm generation module 35, and the key generation module 36. In this embodiment, although not limited to this, a solution is generated each time the encryption/decryption module 33 performs encryption processing or decryption processing. As described above, just before splitting, information indicating that the processing target data or the encrypted data is to be split is transmitted to the solution generation module 34 from the preprocessing module 32 each time processing target data is to be split or encrypted data is to be split. Each time such information is received, the solution generation module 34 generates a solution, and transmits the generated solution to the preprocessing module 32, the algorithm generation module 35, and the key generation module 36.

The algorithm generation module 35 is configured to generate an algorithm based on the solution received from the solution generation module 34. The algorithm is used by the encryption/decryption module 33 when encryption processing and decryption processing are performed. The algorithm generation module 35 is configured to generate an algorithm each time a solution is received, and to transmit the generated algorithm to the encryption/decryption module 33 each time an algorithm is generated.

The key generation module 36 is configured to generate a key based on the solution received from the solution generation module 34. The key is used by the encryption/decryption module 33 when encryption processing and decryption processing are performed. The key generation module 36 is configured to generate a key each time a solution is received, and to transmit the generated key to the encryption/decryption module 33 each time a key is generated.

The connection module 38 has a function of connecting the plaintext split data generated by decrypting the encrypted split data by the encryption/decryption module 33 in the original order to generate a collection of processing target data. This processing target data is transmitted to the interface module 31, and transmitted to the HDD 23 or the CPU 21, for example, via the bus 28 as required. The connection module 38 further has a function of connecting the encrypted split data generated by encrypting the plaintext split data by the encryption/decryption module 33 to generate a collection of encrypted data. This encrypted data is transmitted to the interface module 31, and transmitted to the HDD 23 or the CPU 21, for example, via the bus 28 as required.

Next, the flow of the processing performed in the data processing device 10 is described.

Figure 4:
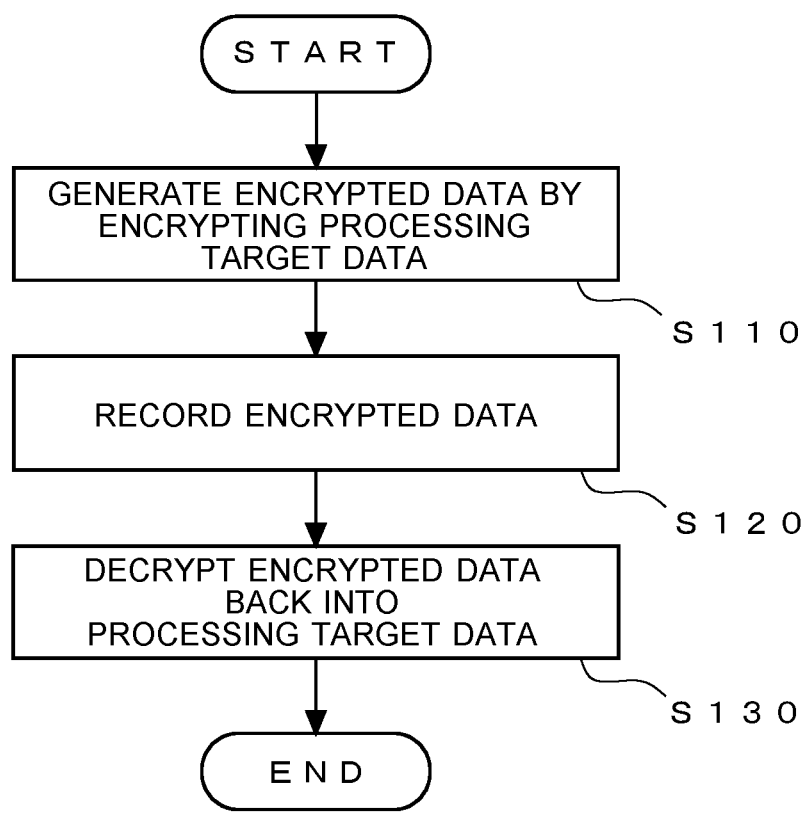
FIG. 4 is a flow chart for illustrating a flow of processing to be executed in the data processing device illustrated in FIG. 1.

The flow of the processing performed in the data processing device 10 is now schematically described with reference to FIG. 4.

First, the data processing device 10 generates encrypted data by encrypting the processing target data (Step S110). The data processing device 10 then records the generated encrypted data (Step S120). Then, the data processing device 10 decrypts the encrypted data back into the processing target data (Step S130). Typically, the processing step of Step S110 in which the data processing device 10 generates encrypted data from the processing target data and the processing step of Step S120 in which the data processing device 10 records the encrypted data are executed as a series of continuous processing steps. Meanwhile, the processing step of Step S130 in which the encrypted data is decrypted back into the processing target data is executed, for example, when a situation in which the encrypted data is to be decrypted occurs for the user of the data processing device 10 as a processing step which is not continuous with the processing steps of Step S110 and Step S120.

Figure 5:
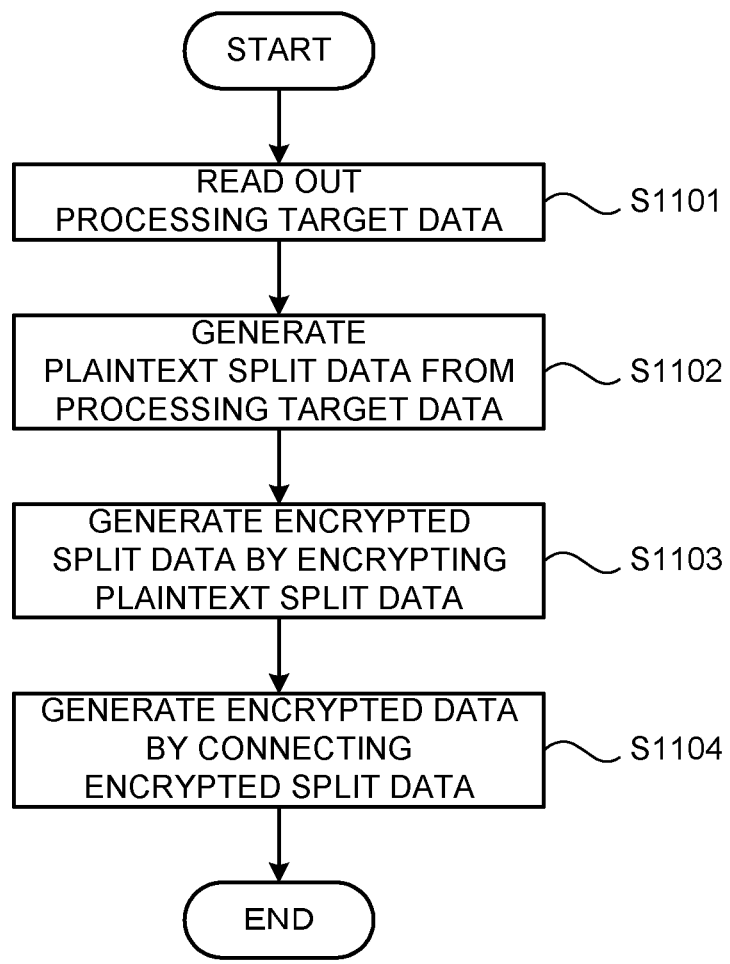
FIG. 5 is a flow chart for illustrating a flow of encryption processing to be executed in the data processing device illustrated in FIG. 1.

First, the processing step of Step S110 in which the data processing device 10 generates encrypted data by encrypting the processing target data is described in detail with reference to FIG. 5.

First, the processing target data is read out. The processing target data is, as described above, data of a text. As long as the processing target data is data of a text, the processing target data may be any data. In this embodiment, it is assumed that the processing target data is recorded in the HDD 23. For example, when a command to encrypt the processing target data is input from the input device 25, the CPU 21 reads out the processing target data from the HDD 23 and temporarily records the processing target data in the RAM 24. This processing target data is transmitted from the RAM 24 to the preprocessing module 32 via the bus 28 and the interface module 31 (Step S1101).

In the preprocessing module 32, the processing target data is split into the predetermined number of bits, or more specifically, into bit lengths equal to or shorter than the bit length of the code for identifying the characters included in the text of the processing target data to generate the plaintext split data (Step S1102). The preprocessing module 32 includes, as required, dummy data in the plaintext split data.

There may be a single method of generating the plaintext split data from the processing target data, but in this embodiment, the plaintext split data is generated from the processing target data based on any one of the following four methods.

A) In addition to generating the plaintext split data by splitting the processing target data into a fixed number of bits shorter than the bit length of the code for identifying the characters, dummy data is included at a certain position of each piece of the plaintext split data having the number of bits which is shorter than the bit length of the code for identifying the characters, and the lengths of all the plaintext split data are aligned to the standard number of bits.

B) In addition to generating the plaintext split data by splitting the processing target data into a fixed number of bits shorter than the bit length of the code for identifying the characters, dummy data is included at a different position of each piece of the plaintext split data having the number of bits which is shorter than the bit length of the code for identifying the characters, and the lengths of all the plaintext split data are aligned to the standard number of bits.

C) In addition to generating the plaintext split data by splitting the processing target data into the number of bits equal to or shorter than the bit length of the code for identifying the characters, dummy data is included in each piece of the plaintext split data having the number of bits which is shorter than the bit length of the code for identifying the characters, and the lengths of all the plaintext split data are aligned to the standard number of bits.

D) The plaintext split data is generated by splitting the processing target data into the same number of bits as the bit length of the code for identifying the characters (in this embodiment, this number of bits is equal to the standard number of bits) (in this case, the use of dummy data is not required).

In this embodiment, which of the above-mentioned four methods is used to generate the plaintext split data from the processing target data is determined based on the solution generated by the solution generation module 34. However, the determination of the method to be used is not limited to this.

Which of the four methods is to be used may be determined in advance. For example, only one of the four methods may always be used.

The preprocessing module 32 splits the processing target data. Each time the preprocessing module 32 splits the processing target data, just before performing the splitting, the preprocessing module 32 transmits information indicating that the processing target data is to be split to the solution generation module 34. Each time the solution generation module 34 receives the information, the solution generation module 34 generates a solution.

There is now given description of how the solution generation module 34 generates a solution.

In this embodiment, the solution is an 8-row by 8-column matrix (X). However, the solution is not limited to this.

The reason why the solution is an 8-row by 8-column matrix in this embodiment is because the standard number of bits is eight bits. For example, when the standard number of bits is 32 bits, the solution may be a 32-row by 32-column matrix, and when the standard number of bits is 64 bits, the solution may be a 64-row by 64-column matrix.

In this embodiment, the solution generation module 34 continuously generates the solutions as a non-linear transition. However, the solution generation module 34 may generate the solutions in another manner.

Examples of methods to continuously generate solutions so as to generate a non-linear transition include (1) in the step of generating the solutions, including an operation of exponentiating previous solutions, (2) in the step of generating the solutions, multiplying two or more previous solutions, or combining (1) and (2).

In this embodiment, the solution generation module 34 has a predetermined solution 01 ($X_{01}$) and a predetermined solution 02 ($X_{02}$) as an initial matrix (for example, the solution 01 and the solution 02 are recorded in the RAM 24).

The solution generation module 34 assigns this initial matrix to a solution generation algorithm to generate a solution 1 ($X_1$) as follows.

$(X_1) = X_{02} X_{01} + \alpha$ ($\alpha$=8-row by 8-column matrix)      Solution 1

This is the first solution to be generated.

Next, when the interface module 31 receives processing target data from the bus 28, the solution generation module 34 generates a solution 2 ($X_2$) as follows.

$(X_2) = X_1 X_{02} + \alpha$      Solution 2

In the same way, each time the interface module 31 receives processing target data from the bus 28, the solution generation module 34 generates a solution 3, a solution 4, . . . a solution N as follows.

$(X_3) = X_2 X_1 + \alpha$      Solution 3

$(X_4) = X_3 X_2 + \alpha$      Solution 4

. . .

$(X_N) = X_{N-1} X_{N-2} + \alpha$      Solution N

The solutions generated in this way are transmitted to the preprocessing module 32, the algorithm generation module 35, and the key generation module 36, and are held in the solution generation module 34. In this embodiment, in order to generate the solution N ($X_N$), the solution N-1 ($X_{N-1}$) and the solution N-2 ($X_{N-2}$), that is, the two solutions generated immediately before that, are used. Therefore, the solution generation module 34 is required to hold the last two solutions generated in the past (or someone else is required to hold those two solutions) in order to generate a new solution. Possession of the last two solutions generated in the past continues during the series of processing steps until the encryption of the processing target data ends. Further, for reasons described later, the initial matrix, that is, the solution 01 ($X_{01}$) and the solution 02 ($X_{02}$) continues to be held.

The solutions generated in this way are a chaotic non-linear transition, and become pseudorandom numbers.

When the solution N is determined, in addition to the above-mentioned expression:

$$(X_N) = X_{N-1} X_{N-2} + \alpha, \quad \text{Solution N}$$

examples of other expressions that can be used to cause a non-linear transition include the following.

$$(X_N) = (X_{N-1})^P \quad \text{(a) Solution N}$$

$$(X_N) = (X_{N-1})^P (X_{N-2})^Q (X_{N-3})^R (X_{N-4})^S \quad \text{(b) Solution N}$$

$$(X_N) = (X_{N-1})^P + (X_{N-2})^Q \quad \text{(c) Solution N}$$

In the expressions, P, Q, R, and S are each a predetermined constant. Further, the solution generation module 34 has two initial matrices when the expression (a) or (c) is used, and has four initial matrices when the expression (b) is used.

Moreover, the above-mentioned "a" is a constant. However, "α" is not limited to being a constant.

As a matter of course, it is also possible to add "α" to the right side of the expressions (a) to (c).

The solution generation module 34 transmits the generated solutions to the preprocessing module 32, the algorithm generation module 35, and the key generation module 36.

The preprocessing module 32 receives the solution. At that point, the preprocessing module 32 is preparing to split the data at the beginning of the processing target data at that time.

The preprocessing module 32 that has received the solution (i.e., the solution described above) determines in accordance with the solution which of the method A), B), C), or D) is to be used to generate the plaintext split data. In this embodiment, each piece of plaintext split data is generated by splitting the sum of the numbers constituting the 8-row by 8-column matrix, which is the solution, by 4, and using the method A) when the remainder is 0, using the method B) when the remainder is 1, using the method C) when the remainder is 2, and using the method D) when the remainder is 3. However, the method used to generate each piece of plaintext split data is not limited to this.

When the method A) is used to generate the plaintext split data, the preprocessing module 32 generates the plaintext split data by splitting the processing target data received from the interface module 31 in order from the beginning of the processing target data into a fixed number of bits (in this embodiment, seven bits, for example) which is shorter than the number of bits of the code for identifying the characters included in the processing target data. Further, the preprocessing module 32 aligns the lengths of all the plaintext split data to the standard number of bits by embedding dummy data at a certain position of the plaintext split data. In this case, the position in which the dummy data is embedded in the processing target data is determined in advance, for example, the position can be at the beginning or end of the plaintext split data, or a predetermined intermediate position such as the second or third bit. The dummy data can be any data which is unrelated to the processing target data. For example, a constant string of 0's can be embedded, or 1's can be embedded, or 1's and 0's can be alternately embedded. Further, as another example, it is also possible to determine what type of dummy data is to be embedded based on the above-mentioned solution. For example, when the sum of the numbers constituting the 8-row by 8-column matrix, which is the solution, is split by 9, and the remainder is 0, the embedded data may have continuous 0's, namely, a string of 0, 0, 0, 0 . . . , when the remainder is 1, the embedded data may have a 1 at every second position, namely, 0, 1, 0, 1 . . . , and when the remainder is 2, the embedded data may have a 1 at every third position, namely, 0, 0, 1, 0, 0, 1 . . . , and so on so that similarly, when the remainder is 3, a 1 may be at every fourth position, when the remainder is 4, a 1 may be at every fifth position, . . . and when the remainder is 9, a 1 may be at every tenth position.

When the method B) is used to generate the plaintext split data, the preprocessing module 32 generates the plaintext split data by splitting the processing target data into a fixed number of bits (seven bits, for example) which is shorter than the number of bits of the code for identifying the characters included in the processing target data. Further, the preprocessing module 32 aligns the bit lengths of all the plaintext split data by including dummy data at a different position for each piece of the plaintext split data. In this case, the position in which the dummy data is embedded may change in a regular manner, for example, moving in order from first bit, second bit, third bit, . . . eighth bit, first bit, second bit, . . . eighth bit, or may change in a random manner (or so as to look as though the dummy data changes in a random manner). When the position in which the dummy data is embedded randomly changes, for example, the position in which the dummy data is embedded may be determined based on the solution.

The method of determining the standard number of bits for embedding the dummy data based on the solution may be performed, for example, by splitting the sum of the numbers constituting the 8-row by 8-column matrix, which is the solution, by 8, and processing such that when the remainder is 0, dummy data is embedded alternately at the beginning and the end of every first piece of plaintext split data, when the remainder is 1, plaintext split data in which dummy data is embedded at the beginning and plaintext split data in which dummy data is embedded at the end are generated every second piece, when the remainder is 2, plaintext split data in which dummy data is embedded at the beginning and plaintext split data in which dummy data is embedded at the end are generated every third piece, and so on until when the remainder is 7, plaintext split data in which dummy data is embedded at the beginning and plaintext split data in which dummy data is embedded at the end are generated every eighth piece. The position for embedding the dummy data is not fixed, for example, embedding at the beginning and the end, and can be further moved.

When the method C) is used to generate the plaintext split data, the processing target data is split into pieces having the number of bits equal to or shorter than the number of bits of the code for identifying the characters included in the processing target data. The splitting can be performed by splitting the processing target data into random lengths of eight bits or shorter than eight bits. For example, the splitting can be performed by splitting the sum of the numbers constituting the 8-row by 8-column matrix, which is the solution, by 8, and when the remainder is 0, the beginning portion of the processing target data at that point in time is split into eight bits, when the remainder is 1, the beginning portion of the processing target data at that point in time is split into single bits, when the remainder is 2, the beginning portion of the processing target data at that point in time is split into two bits, and so on until when the remainder is 7, the beginning portion of the processing target data at that point in time is split into seven bits. Further, of the plaintext split data generated as a result of this processing, the preprocessing module 32 embeds dummy data in each piece of plaintext split data having a shorter number of bits than the standard number of bits. The embedding position of the dummy data in this case may be a specific position, for example, the beginning or the end, or may be a variable predetermined position specified by the solution, for example.

When the method D) is used to generate the plaintext split data, the preprocessing module 32 generates the plaintext split data by splitting the processing target data received from the interface module 31 in order from the beginning of the processing target data into a fixed number of bits (in this embodiment, eight bits, for example) which is the same as the number of bits of the code for identifying the characters included in the processing target data. As a result, even without using dummy data, the number of bits of all the plaintext split data is aligned to the standard number of bits.

As described above, what kind of plaintext split data is generated from the processing target data depends on the content of the solution transmitted from the solution generation module 34. Regardless of which method is used to generate the plaintext split data, the plaintext split data generated in this way is transmitted in a stream to the encryption/decryption module 33 in the order in which the plaintext split data is generated.

In parallel to the generation of the plaintext split data, the algorithm generation module 35 generates an algorithm to be used to encrypt the plaintext split data.

In this embodiment, the algorithm generation module 35 generates an algorithm based on the received solution each time a solution is received from the solution generation module 34. The algorithm may be a fixed algorithm which does not change, or may be selected from a plurality of algorithms prepared in advance.

In this embodiment, the algorithm generation module 35 generates the algorithm as follows.

In this embodiment, the algorithm is defined as "a rule determined by raising, when the 8-bit plaintext split data is a 1-row by 8-column matrix Y, the 8-row by 8-column matrix X, which is the solution, to the power of 'a', and then multiplying Y by a matrix rotated n×90 degrees in the clockwise direction."

Here, "a" may be a predetermined constant, but in this embodiment, "a" is a number which changes based on the solution. That is, the algorithm in this embodiment changes based on the solution. For example, "a" can be determined as the remainder (a=1 when the remainder is 0) obtained when the number obtained by adding all the numbers which are elements in the matrix included in the solution, which is an 8-row by 8-column matrix, is split by 5.

Further, the above-mentioned "n" is a predetermined number determined based on a key. When the key is a fixed number, "n" is fixed, but as described later, the key changes based on the solution. That is, in this embodiment, "n" also changes based on the solution.

However, the algorithm may be determined as something else. In this embodiment, the algorithm generation module 35 generates an algorithm each time a solution is received from the solution generation module 34, and transmits the generated algorithm to the encryption/decryption module 33. As described above, the solution generation module 34 generates a solution each time the preprocessing module 32 generates plaintext split data from the processing target data. Further, the algorithm generation module 35 generates an algorithm each time a solution is received, and thus this means that the algorithm generation module 35 generates an algorithm each time the preprocessing module 32 generates plaintext split data from the processing target data.

In parallel to the generation of the plaintext split data, the key generation module 36 generates a key to be used to encrypt the plaintext split data.

The key generation module 36 generates a key based on the received solution each time a solution is received from the solution generation module 34. The key generation module 36 may be configured to always provide the same fixed key to the encryption/decryption module 33, or may be configured to select the key to be provided to the encryption/decryption module 33 from a plurality of keys prepared in advance.

In this embodiment, the key generation module 36 generates the key as follows.

In this embodiment, the key is a number obtained by adding all the elements of the matrix included in the solution which is an 8-row by 8-column matrix. Therefore, in this embodiment, the key changes based on the solution.

However, the key may be determined as something else.

In this embodiment, the key generation module 36 generates a key each time a solution is received from the solution generation module 34, and transmits the generated key to the encryption/decryption module 33. As described above, the solution generation module 34 generates a solution each time the preprocessing module 32 generates plaintext split data from the processing target data. Further, the key generation module 36 generates a key each time a solution is received, and thus this means that the key generation module 36 generates a key each time the preprocessing module 32 generates plaintext split data from the processing target data.

The encryption/decryption module 33 encrypts the plaintext split data received from the preprocessing module 32 based on the algorithm received from the algorithm generation module 35 and the key received from the key generation module 36 (Step S1103). As described above, the algorithm generation module 35 generates an algorithm each time the preprocessing module 32 generates plaintext split data from the processing target data, and transmits the generated algorithm to the encryption/decryption module 33. Similarly, the key generation module 36 generates a key each time the preprocessing module 32 generates plaintext split data from the processing target data, and transmits the generated key to the encryption/decryption module 33. As a result, the encryption/decryption module 33 receives supply of a new algorithm and a new key from the algorithm generation module 35 and the key generation module 36 each time plaintext split data is received, and through use of the latest supply of an algorithm and a key that has been received, encrypts the plaintext split data based on a different method each time.

As described above, the algorithm is "a rule determined by raising, when the 8-bit plaintext split data is a 1-row by 8-column matrix Y, the 8-row by 8-column matrix X, which is the solution, to the power of 'a', and then multiplying Y by a matrix rotated n×90 degrees in the clockwise direction," and the key "n" is a number like that described above.

For example, when "a" is 3 and "n" is 6, the encryption is performed by multiplying the plaintext split data by an 8-row by 8-column matrix obtained by rotating an 8-row by 8-column matrix obtained by raising X to the power of 3 in a clockwise direction by 6×90 degrees=540 degrees.

The data generated by this processing is encrypted split data.

In this embodiment, the encryption/decryption module 33 repeatedly performs processing of encrypting plaintext split data into encrypted split data. In this embodiment, the algorithm generation module 35 and the key generation module 36 generate the algorithm and the key to be used in the encryption processing each time encryption processing is to be performed, and therefore the method of the encryption processing repeatedly performed in the encryption/decryption module 33 is different each time. However, the encryption processing repeatedly performed is not required to be different each time, and it is sufficient for the encryption processing which is performed in at least one instance to be performed in a method different from that of the other encryption processing. In terms of probability, it is possible that the same algorithms and keys may occur, and such an occurrence is permissible. When at least one of the algorithm or the key used in one instance of encryption processing is different from the algorithms and keys used in combination in the other instances of encryption processing, the encryption method is different. As described above, in this embodiment, it is possible that the algorithms and the keys changing each time encryption processing is executed do not always change, and the algorithm or the key can always be the same. However, it is required that the method used in at least one instance of encryption processing be different from the method used in the other instances of encryption processing, and thus it is not permissible for both the algorithm and the key to be fixed.

In any case, the encryption/decryption module 33 transmits the generated encrypted split data to the connection module 38.

The encrypted split data is received by the connection module 38. The connection module 38 connects the encrypted split data together to generate encrypted data (Step S1104). The order of the encrypted split data at this time is assumed to correspond to the order of the original plaintext split data.

First, the step of Step S110, in which the data processing device 10 generates encrypted data by encrypting the processing target data in the manner described above, ends.

The encrypted data is transmitted from the connection module 38 to the interface module 31, then further transmitted to the HDD 23 via the bus 28, and recorded in the HDD 23. In this way, the processing step of Step S120 ends.

Next, when a situation in which the user requires the encrypted data to be decrypted occurs, the step of Step S130 in which the encrypted data is decrypted back into the processing target data is executed.

Figure 6:
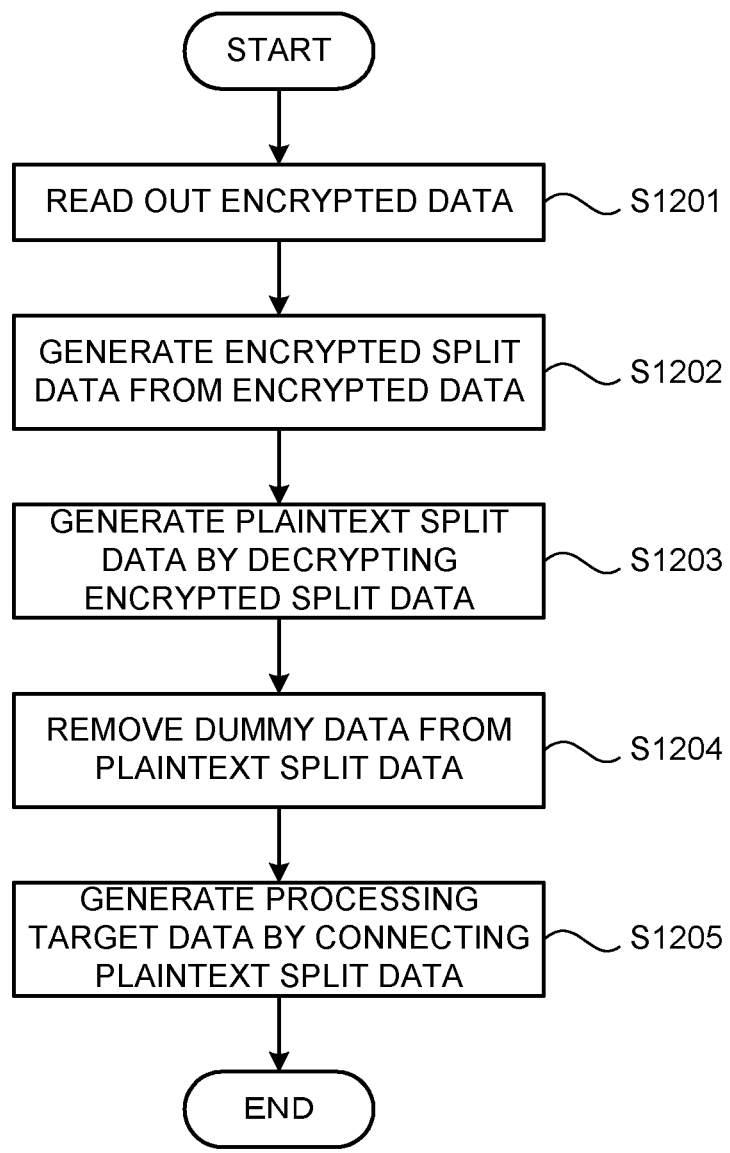
FIG. 6 is a flow chart for illustrating a flow of decryption processing to be executed in the data processing device illustrated in FIG. 1.

The decryption step is now described in detail with reference to FIG. 6.

For example, when a command to decrypt the encrypted data is input by the user from the input device 25, the CPU 21 reads out the encrypted data from the HDD 23 in which the encrypted data is recorded, and temporarily records the encrypted data in the RAM 24. This encrypted data is transmitted from the RAM 24 to the preprocessing module 32 via the bus 28 and the interface module 31 (Step S1201).

The preprocessing module 32 generates the encrypted split data by splitting the received encrypted data into pieces having the predetermined number of bits (Step S1202).

When the encrypted split data is generated by splitting the encrypted data, the preprocessing module 32 performs the opposite processing to that performed by the connection module 38 of the data processing device 10. That is, the encrypted data is split into eight-bit pieces from the beginning to generate a plurality of pieces of encrypted split data.

The encrypted split data is then transmitted to the encryption/decryption module 33, and in the encryption/decryption module 33, the encrypted split data is decrypted to generate plaintext split data (Step S1203).

A solution is required for the processing of generating encrypted split data from encrypted data.

Further, the decryption processing performed by the encryption/decryption module 33 is executed as the opposite processing to that of the encryption processing performed by the encryption/decryption module 33, and therefore when decryption is performed by the encryption/decryption module 33, the algorithm and the key used when encryption is performed in order to obtain the encrypted data is required by the encryption/decryption module 33. Therefore, when decryption is performed in the data processing device 10, the algorithm and key is generated before encryption is performed in the data processing device 10, and the solution is generated before the generation of the algorithm and the key.

The encrypted data described above read out from the HDD 23 is transmitted to the preprocessing module 32. Then, the preprocessing module 32 splits the encrypted data. Each time the preprocessing module 32 splits the processing target data, just before performing the splitting, the preprocessing module 32 transmits information indicating that the encrypted data is to be split to the solution generation module 34. Each time the solution generation module 34 receives the information, the solution generation module 34 generates a solution.

The method in which the solution generation module 34 generates solutions when the encrypted data is decrypted is the same as the method in which the solutions are generated by the solution generation module 34 when the processing target data is encrypted. As described above, the same initial matrix and algorithm for solution generation as those held by the solution generation module 34 are stored in the solution generation module 34 as they are, and therefore the same solutions used when the processing target data is encrypted can also be generated when the encrypted data is decrypting. The solutions generated by the solution generation module 34 when the encrypted data is decrypted are, when solutions generated in the same order are compared with each other, the same as the solutions generated by the solution generation module 34 when the processing target data is encrypted. That is, in this embodiment, the initial matrix to be used is the same when the processing target data is encrypted as when the encrypted data is decrypted, and therefore the solutions created based on the initial matrix are the same in both cases.

The generated solutions are transmitted from the solution generation module 34 to the preprocessing module 32, the algorithm generation module 35, and the key generation module 36.

The preprocessing module 32 receives the solutions. At this point, the preprocessing module 32 is preparing to split the data at the beginning of the encrypted data at that point in time. The preprocessing module 32 receives a solution and generates encrypted split data by splitting the encrypted data. In this case, the splitting is executed as a split into fixed lengths for each standard number of bits, and the processing does not depend on the content of the solution. In this respect, the processing executed by the preprocessing module 32 of the data processing device 10 is different between the case of encrypting the processing target data and the case of decrypting the encrypted data. When the preprocessing module 32 does not use a solution, the provision of solutions from the solution generation module 34 to the preprocessing module 32 may be omitted.

Meanwhile, the algorithm generation module 35 generates an algorithm each time a solution is received based on the received solution. The process by which the algorithm generation module 35 generates algorithms when the encrypted data is decrypted is the same as the process by which the algorithm generation module 35 generates algorithms when the processing target data is encrypted. The generated algorithms are transmitted from the algorithm generation module 35 to the encryption/decryption module 33. The many algorithms generated when the encrypted data is decrypted are, when algorithms generated in the same order are compared with each other, the same as the many algorithms generated when the processing target data is encrypted.

The key generation module 36 generates a key each time a solution is received based on the received solution. The process by which the key generation module 36 generates keys when the encrypted data is decrypted is the same as the process by which the key generation module 36 generates keys when the processing target data is encrypted. The generated keys are transmitted from the key generation module 36 to the encryption/decryption module 33. The many keys generated when the encrypted data is decrypted are, when keys generated in the same order are compared with each other, the same as the many keys generated when the processing target data is encrypted.

When the processing of decrypting the encrypted data is executed, in the same manner as the processing of encrypting the processing target data, the encryption/decryption module 33 is supplied with a new algorithm and key from the algorithm generation module 35 and the key generation module 36 each time encrypted split data is received. The encryption/decryption module 33 decrypts the encrypted split data back into the plaintext split data by using the latest received algorithm and key.

In the data processing device 10, the processing of encrypting the plaintext split data and the processing of decrypting the encrypted split data are each performed a plurality of times, usually many times. Further, the number of pieces of encrypted split data matches the number of pieces of plaintext split data, and therefore the number of times for which decryption of the encrypted split data is performed matches the number of times for which encryption of the plaintext split data is performed. Further, the plurality of (many) solutions generated by the solution generation module 34 when encryption processing of the processing target data is performed and decryption of the encrypted data is performed in the data processing device 10 are the same when the generated solutions are compared in the same order, and thus the algorithms and keys supplied to the encryption/decryption module 33 each time the encrypted split data is decrypted always match the algorithms and keys used when the plaintext split data is encrypted in order to obtain the encrypted split data.

As described above, in the encryption/decryption module 33, the decryption processing is performed by using the algorithms received from the algorithm generation module 35. More specifically, the encryption/decryption module 33 performs the decryption processing by generating, based on an algorithm (a definition that "data determined by raising, when the 8-bit plaintext split data is a 1-row by 8-column matrix Y, the 8-row by 8-column matrix X, which is the solution, to the power of 'a', and then multiplying Y by a matrix rotated n×90 degrees in the clockwise direction is the encrypted split data") received from the algorithm generation module 35, an algorithm (a definition that "data determined by raising, when the encrypted split data is a 1-row by 8-column matrix Z, the 8-row by 8-column matrix X, which is the solution, to the power of 'a', and then multiplying Y by an inverse matrix rotated n×90 degrees in the clockwise direction is the plaintext split data") for performing the decryption processing, and then performing an arithmetic operation in accordance with the above-mentioned definitions by using the key. In this way, in the encryption/decryption module 33, the pieces of encrypted split data supplied in a stream from the preprocessing module 32 are decrypted one after another to generate the plaintext split data.

Next, the encryption/decryption module 33 removes the dummy data from the plaintext split data as required (Step S1204). As described above, the solutions generated by the solution generation module 34 are transmitted to the preprocessing module 32. Those solutions are the solutions used in the preprocessing module 32 of the data processing device 10 to determine how the dummy data is embedded in the plaintext split data. That is, the solutions that the preprocessing module 32 has at that point in time indicate how the dummy data is embedded in the encrypted split data (more precisely, the plaintext split data before the encrypted split data thereof is encrypted) which has been decrypted by the encryption/decryption module 33 (or is decrypting, or attempting to decrypt from now on).

The preprocessing module 32 transmits, to the encryption/decryption module 33, information on where the dummy data is embedded in the plaintext split data decrypted by the encryption/decryption module 33.

The encryption/decryption module 33 uses this information to remove the dummy data from the plaintext split data. When dummy data is not included in the plaintext split data, this processing of removing dummy data is omitted.

The plaintext split data generated in this way is transmitted to the connection module 38. The connection module 38 connects the received plaintext split data together to return the plaintext split data to the processing target data in its original state before encryption in the data processing device 10 (Step S1205).

In this way, the step of Step S130, which decrypts the encrypted data back into the processing target data, ends.

The generated processing target data is transmitted from the connection module 38 to the interface module 31, transmitted via the bus 28 to, for example, the HDD 23, and stored in the HDD 23. In another case, the processing target data may be transmitted to the CPU 21 and used appropriately. For example, an image corresponding to the content of the processing target data is displayed on the display device 26.

Second Embodiment

In the second embodiment, a data processing device 10 is also described.

The data processing device 10 of the second embodiment is almost unchanged from the data processing device 10 of the first embodiment. In particular, there is no difference between the first embodiment and the second embodiment in terms of the hardware configuration described with reference to FIG. 1 and FIG. 2. Further, the function blocks generated in the data processing device 10 of the second embodiment are as illustrated in FIG. 3, and are not different from the function blocks generated in the data processing device 10 of the first embodiment. Moreover, the function of each function block in the first embodiment and the second embodiment is generally the same.

The data processing device 10 of the first embodiment and the data processing device 10 of the second embodiment differ only in the method of encrypting the processing target data and the method of decrypting the encrypted data. Those differences occur based on a slight difference in the function of the solution generation module 34 between the first embodiment and the second embodiment.

As described above, the solution generation module 34 in the first embodiment holds a solution 01 ($X_{01}$) and a solution 02 ($X_{02}$) defined in advance as the initial matrix, and continues to hold those solutions.

Consideration is now given to a case in which the data processing device 10 of the first embodiment encrypts certain processing target data. When the processing target data is split by the preprocessing module 32, the processing target data is divided into, for example, 1,000 pieces of plaintext split data. In this case, the solution generation module 34 generates 1,000 solutions, that is, 1,000 solutions from the solution 1 ($X_1$) to the solution 1000 ($X_{1000}$). As already described, those 1,000 solutions are used to determine how the preprocessing module 32 is to split the processing target data and how dummy data is to be handled. The 1,000 solutions are used for the algorithm generation module 35 to generate algorithms, and also for the key generation module 36 to generate keys. The encryption processing of the plaintext split data performed by the encryption/decryption module 33 1,000 times depends on what kind of plaintext split data is to be generated by the preprocessing module 32, and what kind of algorithms and keys are to be supplied from the algorithm generation module 35 and the key generation module 36. Therefore, simply stated, the method of processing of encrypting the processing target data executed in the data processing device 10 of the first embodiment depends on the solution 01 ($X_{01}$) and the solution 02 ($X_{02}$) that are the initial matrix.

This is true even when other processing target data is to be encrypted. In a case in which different processing target data is to be encrypted after the processing target data described above, and the new processing target data is to be divided into 1,500 pieces of plaintext split data by the preprocessing module 32, the solution generation module 34 generates 1,500 solutions from the solution 1 ($X_1$) to the solution 1500 ($X_{1500}$) based on the solution 01 ($X_{01}$) and the solution 02 ($X_{02}$), which are the same initial matrix as described above.

In the first embodiment, the initial matrix is continuously held by the solution generation module 34, and therefore does not change. However, this means that the solutions generated when the processing target data is encrypted in the two examples described above are exactly the same from the solution 1 ($X_1$) to the solution 1000 ($X_{1000}$). That is, of the encryption processing of the processing target data in the two examples described above, the processing method (how the plaintext split data is created and the algorithms and keys used for encryption) when the first to 1000th pieces of plaintext split data are encrypted is exactly the same. Such a situation does not immediately lead to a conclusion that the cryptographic strength employed in the data processing device 10 of this embodiment is weak, but it is obvious that the cryptographic strength can be enhanced more easily by changing the encryption processing method each time the processing target data is encrypted or by at least changing the encryption method when processing target data is encrypted a plurality of times.

In the second embodiment, there is disclosed an example of a method of changing the encryption method each time the processing target data is encrypted. Any method may be used to change the encryption method, but in this embodiment, the encryption method is changed by using a different initial matrix each time the processing target data is encrypted. However, the method of changing the encryption method is not limited to this. As described above, the encryption method in the first embodiment is dependent on the initial matrix, and therefore by using a different initial matrix each time the processing target data is encrypted, the encryption method can be changed each time the processing target data is encrypted.

Despite that, in the case of the first embodiment, the encryption is performed by using an unchanged fixed matrix and the solution generation module 34 continues to hold that fixed initial matrix. As a result, when the encrypted data is decrypted, the solution generation module 34 can generate the same solutions as the solutions generated when the processing target data used as the source of the encrypted data to be decrypted is encrypted. This fact ensures that the data processing device 10 of the first embodiment can decrypt encrypted data obtained by encrypting the processing target data in the data processing device 10.

However, in the second embodiment, a different initial matrix is used each time processing target data is encrypted, and therefore in order to decrypt certain encrypted data back into the processing target data, decryption of the encrypted data may not be performed unless the data processing device 10 grasps the solutions generated when the processing target data used as the source of the encrypted data to be decrypted is encrypted, or the solutions generated when the processing target data used as the source of the encrypted data is encrypted are generated again.

In the second embodiment, it is possible to solve the above by using the identification information described below.

There is now considered a case in which the processing target data is encrypted for the first time in the data processing device 10 of the second embodiment. In this case, the solution generation module 34 holds the solution 01 ($X_{01}$) and the solution 02 ($X_{02}$) as the initial matrix.

When encryption processing is performed for the first time, the processing target data read out from the HDD 23 is transmitted to the preprocessing module 32 via the interface module 31, and the processing target data is divided into many pieces of plaintext split data in the preprocessing module 32. In the second embodiment as well, in parallel to this processing, the solution generation module 34 generates a solution 1, a solution 2, a solution 3, and so on by using the initial matrix. When the solution generation algorithm is the same as in the first embodiment, all of the solutions generated in this case in the second embodiment are the same as in the first embodiment.

In the second embodiment as well, the solution generation module 34 transmits the generated solutions to the preprocessing module 32, the algorithm generation module 35, and the key generation module 36. The methods of using the solutions in the transmission destinations are the same as in the first embodiment. Similarly to the first embodiment, in the second embodiment as well, the number of solutions transmitted to the preprocessing module 32, the algorithm generation module 35, and the key generation module 36 is the same as the number of pieces of plaintext split data. For example, after consecutively generating the same number of a series of solutions as the number of pieces of plaintext split data, the solution generation module 34 transmits the initial matrix used to generate the series of solutions, that is, the solution 01 ($X_{01}$) and the solution 02 ($X_{02}$), to the interface module 31. Similarly to the first embodiment, encrypted data is transmitted from the connection module 38 to the interface module 31. The interface module 31 associates the solution 01 ($X_{01}$) and the solution 02 ($X_{02}$) with the encrypted data, and transmits the encrypted data with which the solution 01 ($X_{01}$) and the solution 02 ($X_{02}$) are associated to the HDD 23. In the second embodiment, the encrypted data recorded in the HDD 23 is associated with the initial matrix used when the processing target data used as the source of the encrypted data is encrypted. The initial matrix associated with the encrypted data is an example of identification information.

Meanwhile, when the solution generation module 34 in the second embodiment transmits an initial matrix to the interface module 31, the initial matrix is overwritten by the last two of the series of consecutively generated solutions in the same number as the number of pieces of plaintext split data. That is, in a case in which the solution generation module 34 generates 1,000 solutions from the solution 1 ($X_1$) to the solution 1000 ($X_{1000}$) when the processing target data is encrypted, the solution generation module 34 overwrites the solution 01 ($X_{01}$) and the solution 02 ($X_{02}$) with the solution 999 ($X_{999}$) and the solution 1000 ($X_{1000}$).

Next, there is now considered a case in which the processing target data is encrypted for the second time in the data processing device 10 of the second embodiment. In this case, the solution generation module 34 holds the solution 999 ($X_{999}$) and the solution 1000 ($X_{1000}$) as the initial matrix.

When encryption processing is performed for the second time, the processing target data read out from the HDD 23 is transmitted to the preprocessing module 32 via the interface module 31, and the processing target data is divided into many pieces of plaintext split data in the preprocessing module 32. In this case as well, in parallel to this processing, the solution generation module 34 generates a solution 1, a solution 2, a solution 3, and so on by using the initial matrix. The initial matrix differs from the case in which the encryption processing is performed for the first time, and therefore the solutions generated when the encryption processing is performed for the second time are different from the solutions generated when the encryption processing is performed for the first time.

When encryption processing is performed for the second time as well, the solution generation module 34 transmits the generated solutions to the preprocessing module 32, the algorithm generation module 35, and the key generation module 36. For example, after consecutively generating the same number of a series of solutions as the number of pieces of plaintext split data, the solution generation module 34 transmits the initial matrix used to generate the series of solutions, that is, the solution 999 ($X_{999}$) and the solution 1000 ($X_{1000}$), to the interface module 31. Encrypted data is transmitted from the connection module 38 to the interface module 31. The interface module 31 associates the solution 999 ($X_{999}$) and the solution 1000 ($X_{1000}$) with the encrypted data, and transmits the encrypted data with which the solution 999 ($X_{999}$) and the solution 1000 ($X_{1000}$) are associated to the HDD 23. The encrypted data recorded in the HDD 23 is associated with the initial matrix used when the processing target data used as the source of the encrypted data is encrypted.

Meanwhile, when the solution generation module 34 in the second embodiment transmits an initial matrix to the interface module 31, the initial matrix is overwritten by the last two of the series of consecutively generated solutions in the same number as the number of pieces of plaintext split data. That is, in a case in which the solution generation module 34 generates 500 solutions from a solution 1001 ($X_{1001}$) to a solution 1500 ($X_{1500}$) when the processing target data is encrypted, the solution generation module 34 overwrites the solution 999 ($X_{999}$) and the solution 1000 ($X_{1000}$) with the solution 1499 ($X_{1499}$) and the solution 1500 ($X_{1500}$).

The above-mentioned processing is repeated even when encryption for a third time or more is performed. As a result, in the data processing device 10 of the second embodiment, the solutions are generated based on a different initial matrix each time processing of encrypting the processing target data is performed, and thus the processing of encrypting the processing target data is executed by different methods each time which depend on different initial matrices.

Next, there is described a case in which the encrypted data is decrypted in the data processing device 10 of the second embodiment. In the second embodiment as well, the decryption of the encrypted data is performed when the user wants to decrypt the encrypted data.

Similarly to the first embodiment, in the second embodiment as well, when the encrypted data is decrypted, the encrypted data is read out from, for example, the HDD 23. The initial matrix is associated with the encrypted data to be read out as identification information, and the initial matrix is read out from the HDD 23 together with the encrypted data.

When decryption processing is performed, the encrypted data read out from the HDD 23 is transmitted to the preprocessing module 32 via the interface module 31, and the encrypted data is divided into many pieces of encrypted split data by the preprocessing module 32. In the case of the decryption processing in the second embodiment as well, in parallel to this processing, the solution generation module 34 generates a solution 1, a solution 2, a solution 3, and so on by using the initial matrix. The initial matrix used by the solution generation module 34 to generate the solutions is the initial matrix read out together with the encrypted data from HDD 23. In the second embodiment, the initial matrix read out from the HDD 23 for decrypting the encrypted data is transmitted from the interface module 31 to the solution generation module 34. As described above, the initial matrix at that time is recorded in the solution generation module 34, but the initial matrix recorded in the solution generation module 34 is used only when the processing target data is encrypted, and is not used when the encrypted data is decrypted.

The initial matrix used by the solution generation module 34 in order to generate the solutions is an initial matrix recorded in the HDD 23 in association with the encrypted data to be decrypted, and the initial matrix is the initial matrix used in order to generate the series of solutions used when the processing target data used as the source of the encrypted data to be decrypted is encrypted. Through use of the same solutions as those, the solution generation module 34 can generate a completely identical series of solutions as the series of solutions used when the processing target data used as the source of the encrypted data to be decrypted is encrypted.

When decryption of the encrypted data is performed in the second embodiment as well, the solution generation module 34 transmits the generated solutions to the preprocessing module 32, the algorithm generation module 35, and the key generation module 36. The methods of using the solutions at the transmission destinations are the same as in the first embodiment. As a result, in the second embodiment as well, in which the method of encryption processing is changed each time processing target data is encrypted, the encrypted data can be decrypted by using the initial matrix as identification information.

The invention claimed is:

1. A data processing device, which includes: a function of generating encrypted data by encrypting processing target data, which is data relating to a text and is plaintext, by using a different method for each piece of processing target data; a recording medium configured to record the encrypted data; and a function of generating the processing target data by decrypting the encrypted data read out from the recording medium by using the same method as a method used to encrypt the processing target data, the data processing device comprising:
a splitting module configured to generate a plurality of pieces of plaintext split data by splitting the processing target data into pieces having a predetermined number of bits, and to generate a plurality of pieces of encrypted split data by splitting the encrypted data into pieces having the same number of bits as a number of bits used when the processing target data is encrypted and split;
an encryption/decryption module configured to generate encrypted split data by encrypting the plurality of pieces of plaintext split data by using a predetermined key and an algorithm, and to generate plaintext split data by decrypting the plurality of pieces of encrypted split data by using the predetermined key and the algorithm which have been used to encrypt the plurality of pieces of plaintext split data;
a reading/writing module configured to record the encrypted data obtained by gathering together the encrypted split data encrypted by the encryption/decryption module in the recording medium, and to read out the encrypted data recorded in the recording medium from the recording medium; and
a connection module configured to generate the processing target data by connecting decrypted plaintext split data,
wherein the splitting module is configured to generate a plurality of pieces of plaintext split data by splitting the processing target data into bit lengths equal to or shorter than a bit length of a code for identifying characters included in the text, and
wherein the encryption/decryption module is configured to use, when the plurality of pieces of plaintext split data are encrypted, a different method to encrypt at least one piece of the plurality of pieces of plaintext split data from an encryption method used to encrypt other pieces of the plurality of pieces of plaintext split data, and to use, when the plurality of pieces of encrypted split data obtained by the splitting module are decrypted, a different decryption method corresponding to the encryption method executed by the encryption/decryption module.

2. The data processing device according to claim 1, wherein the splitting module is configured to split the processing target data into a fixed number of bits.

3. The data processing device according to claim 1, wherein the splitting module is configured to split the processing target data so that at least one piece of the plaintext split data except the last piece has a number of bits different from the number of bits of other pieces of the plaintext split data.

4. The data processing device according to claim 1, further comprising:
a mixing module configured to align, before encryption by the encryption/decryption module into the plurality of pieces of plaintext split data obtained by the splitting module, the number of bits of all the plurality of pieces of plaintext split data to a predetermined number of bits by including dummy data unrelated to the processing target data; and
a removing module configured to remove the dummy data from the plurality of pieces of plaintext split data obtained by decrypting the plurality of pieces of encrypted split data by the encryption/decryption module.

5. The data processing device according to claim 4, wherein the mixing module is configured to include the dummy data at a specific position of the plurality of pieces of plaintext split data.

6. The data processing device according to claim 4, wherein the mixing module is configured to include the dummy data at a predetermined position which is different for each of the plurality of pieces of the plaintext split data.

7. The data processing device according to claim 1, wherein the encryption/decryption module is configured to change the method of encrypting the plurality of pieces of plaintext split data by changing at least one of the algorithm or the predetermined key to be used in encryption.

8. The data processing device according to claim 7, further comprising a solution generation module configured to generate the same solution which is a pseudorandom number under the same condition,
wherein the encryption/decryption module is configured to determine the encryption method and the decryption method based on the solution generated by the solution generation module.

9. The data processing device according to claim 1, wherein the encryption/decryption module is configured to change the method of encrypting the plurality of pieces of plaintext split data each time the plurality of pieces of plaintext split data are encrypted.

10. The data processing device according to claim 1, further comprising identification and recording module for recording identification information for identifying the encryption method used when the processing target data is encrypted by the encryption/decryption module in association with the encrypted data generated by encrypting the processing target data,
wherein the encryption/decryption module is configured to decrypt, when the encrypted data is decrypted, the encrypted data by a method identified by the identification information by reading out the identification information recorded in association with the encrypted data from the identification and recording module.

11. A data processing method to be executed by a data processing device configured to execute the steps of:
generating encrypted data by encrypting processing target data, which is data relating to a text and is plaintext, by using a different method for each piece of processing target data;
recording the encrypted data in a predetermined recording medium; and
generating the processing target data by decrypting the encrypted data read out from the recording medium by using the same method as a method used to encrypt the processing target data,
the data processing method, which is executed by the data processing device, comprising the steps of:
generating a plurality of pieces of plaintext split data by splitting the processing target data into pieces having a predetermined number of bits;
generating encrypted split data by encrypting the plurality of pieces of plaintext split data by using a predetermined key and an algorithm;
recording the encrypted data obtained by gathering together the encrypted split data in the recording medium;
reading out the encrypted data recorded in the recording medium from the recording medium;
generating a plurality of pieces of encrypted split data by splitting the encrypted data into pieces having a same number of bits as the number of bits used when the processing target data is encrypted and split;
generating plaintext split data by decrypting the plurality of pieces of encrypted split data by using the predetermined key and the algorithm which have been used to encrypt the plurality of pieces of plaintext split data; and
generating the processing target data by connecting decrypted plaintext split data,
wherein the step of generating a plurality of pieces of plaintext split data by splitting the processing target data into pieces having a predetermined number of bits includes generating the plurality of pieces of plaintext split data by splitting the processing target data into bit lengths equal to or shorter than a bit length of a code for identifying characters included in the text,
wherein the step of encrypting the plurality of pieces of plaintext split data includes using, when the plurality of pieces of plaintext split data are encrypted, a different method to encrypt at least one piece of the plurality of pieces of plaintext split data from an encryption method used to encrypt other pieces of the plurality of pieces of plaintext split data, and
wherein the step of decrypting the plurality of pieces of encrypted split data includes using, when the plurality of pieces of encrypted split data obtained in the step of splitting the encrypted data are decrypted, a different decryption method corresponding to the encryption method used in the step of encrypting the plurality of pieces of plaintext split data.

12. A non-transitory tangible computer readable storage media encoded with instructions that, when executed by at least one processor, is configured to cause the at least one processor to provide:
a function of generating encrypted data by encrypting processing target data, which is data relating to a text and is plaintext, by using a different method for each piece of processing target data;
a recording medium configured to record the encrypted data; and
a function of generating the processing target data by decrypting the encrypted data read out from the recording medium by using a same method as a method used to encrypt the processing target data,
the instructions causing the at least one processor to execute the steps of:
generating a plurality of pieces of plaintext split data by splitting the processing target data into pieces having a predetermined number of bits;
generating encrypted split data by encrypting the plurality of pieces of plaintext split data by using a predetermined key and an algorithm;
recording the encrypted data obtained by gathering together the encrypted split data in the recording medium;
reading out the encrypted data recorded in the recording medium from the recording medium;
generating a plurality of pieces of encrypted split data by splitting the encrypted data into pieces having a same number of bits as the number of bits used when the processing target data is encrypted and split;
generating plaintext split data by decrypting the plurality of pieces of encrypted split data by using the predetermined key and the algorithm which have been used to encrypt the plurality of pieces of plaintext split data; and
generating the processing target data by connecting decrypted plaintext split data,
wherein the step of generating a plurality of pieces of plaintext split data by splitting the processing target data into pieces having a predetermined number of bits includes causing the at least one processor to generate the plurality of pieces of plaintext split data by splitting the processing target data into bit lengths equal to or shorter than a bit length of a code for identifying characters included in the text,
wherein the step of encrypting the plurality of pieces of plaintext split data includes causing the at least one processor to use, when the plurality of pieces plaintext split data are encrypted, a different method to encrypt at least one piece of the plurality of pieces of plaintext split data from an encryption method used to encrypt other pieces of the plurality of pieces of plaintext split data, and
wherein the step of decrypting the plurality of pieces of encrypted split data includes causing the at least one processor to use, when the plurality of pieces of encrypted split data obtained in the step of splitting the encrypted data are decrypted, a different decryption method corresponding to the encryption method used in the step of encrypting the plurality of pieces of plaintext split data.

* * * * *